United States Patent
Raman

(10) Patent No.: US 9,882,922 B2
(45) Date of Patent: *Jan. 30, 2018

(54) METHODS AND SYSTEMS FOR DETECTING AN ELECTRONIC INTRUSION

(71) Applicant: eBay Inc., San Jose, CA (US)

(72) Inventor: Srinivasan Raman, Cupertino, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/386,865

(22) Filed: Dec. 21, 2016

(65) Prior Publication Data

US 2017/0104772 A1 Apr. 13, 2017

Related U.S. Application Data

(63) Continuation of application No. 14/966,506, filed on Dec. 11, 2015, now Pat. No. 9,531,739, which is a continuation of application No. 13/670,887, filed on Nov. 7, 2012, now Pat. No. 9,213,833.

(51) Int. Cl.
*G06F 21/00* (2013.01)
*H04L 29/06* (2006.01)

(52) U.S. Cl.
CPC ...... *H04L 63/1416* (2013.01); *H04L 63/1441* (2013.01); *H04L 67/42* (2013.01)

(58) Field of Classification Search
CPC .. H04L 63/1416; H04L 63/1441; H04L 67/42
See application file for complete search history.

(56) References Cited

U.S. PATENT DOCUMENTS

| 7,322,040 B1 | 1/2008 | Olson et al. |
| 8,739,278 B2 | 5/2014 | Varghese |
| 8,863,226 B1 * | 10/2014 | Bailey, Jr. .......... G06Q 30/0601 713/170 |
| 9,213,833 B2 | 12/2015 | Raman et al. |
| 9,531,739 B2 | 12/2016 | Raman |
| 2005/0010483 A1 | 1/2005 | Ling |

(Continued)

OTHER PUBLICATIONS

"U.S. Appl. No. 13/670,887, Final Office Action dated Mar. 23, 2015", 12 pgs.

(Continued)

*Primary Examiner* — Saleh Najjar
*Assistant Examiner* — Devin Almeida
(74) *Attorney, Agent, or Firm* — Schwegman Lundberg & Woessner, P.A.

(57) ABSTRACT

Methods and systems for detecting an electronic intrusion are described. A user activity may be identified for a user account. A location of a user corresponding to the user account may be determined. It may be identified, based in part on the location of the user, whether to communicate a request to the user for instructions to respond to the user activity. A response may be received from the user in response to determining to communicate the request to the user for instructions. The response may include instructions to block access to the user account at a server. Command information may be communicated to the server. The command information may include a command to block access to the user account.

20 Claims, 15 Drawing Sheets

(56) References Cited

U.S. PATENT DOCUMENTS

| | | | |
|---|---|---|---|
| 2007/0045403 A1* | 3/2007 | Slonecker, Jr. | G06Q 20/354 235/380 |
| 2007/0055785 A1* | 3/2007 | Stevens | G06Q 20/32 709/229 |
| 2007/0192248 A1* | 8/2007 | West | G06Q 20/108 705/42 |
| 2014/0130159 A1 | 5/2014 | Raman | |
| 2016/0099957 A1 | 4/2016 | Raman | |

OTHER PUBLICATIONS

"U.S. Appl. No. 13/670,887, Non Final Office Action dated Jun. 27, 2014", 12 pgs.

"U.S. Appl. No. 13/670,887, Notice of Allowance dated Aug. 12, 2015", 7 pgs.

"U.S. Appl. No. 13/670,887, Response filed Jun. 23, 2015 to Final Office Action dated Mar. 23, 2015", 9 pgs.

"U.S. Appl. No. 13/670,887, Response filed Nov. 26, 2014 to Non Final Office Action dated Jun. 27, 2014", 11 pgs.

"U.S. Appl. No. 14/966,506, First Action Interview—Pre-Interview Communication dated Jun. 16, 2016", 3 pgs.

"U.S. Appl. No. 14/966,506, Notice of Allowance dated Aug. 26, 2016", 7 pgs.

"U.S. Appl. No. 14/966,506, Response filed Aug. 16, 2016 to First Action Interview—Pre-Interview Communication dated Jun. 16, 2016", 3 pgs.

\* cited by examiner

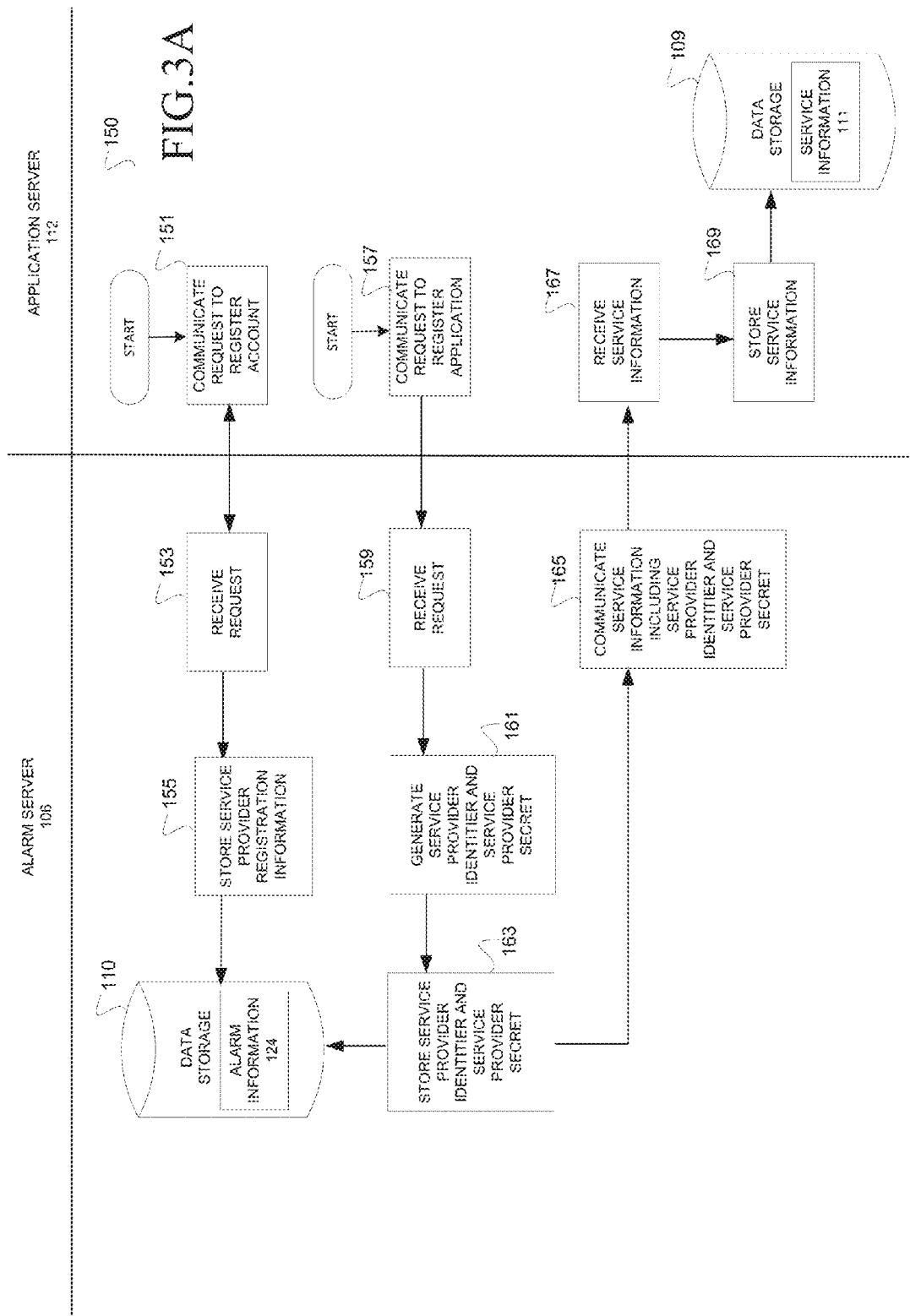

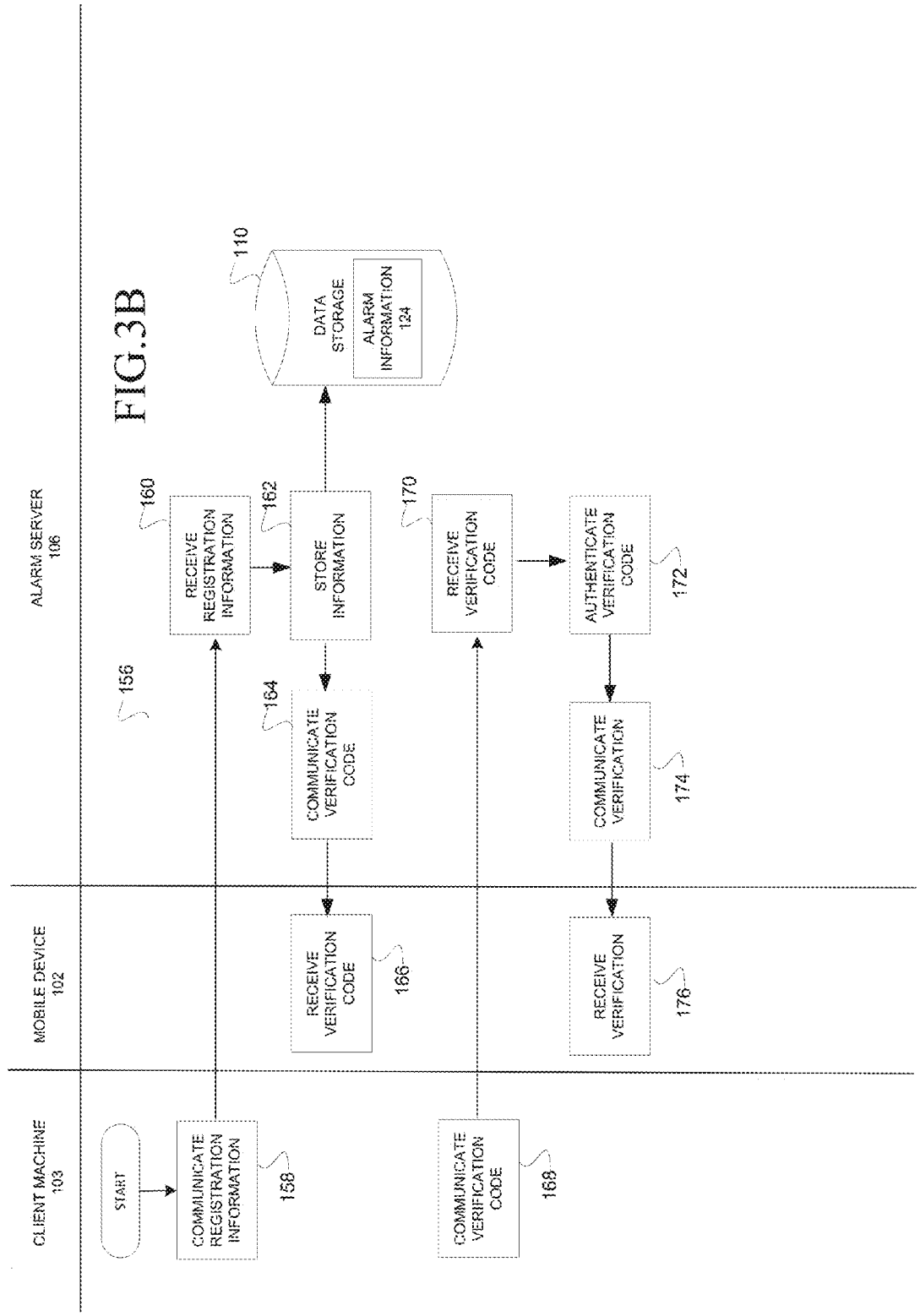

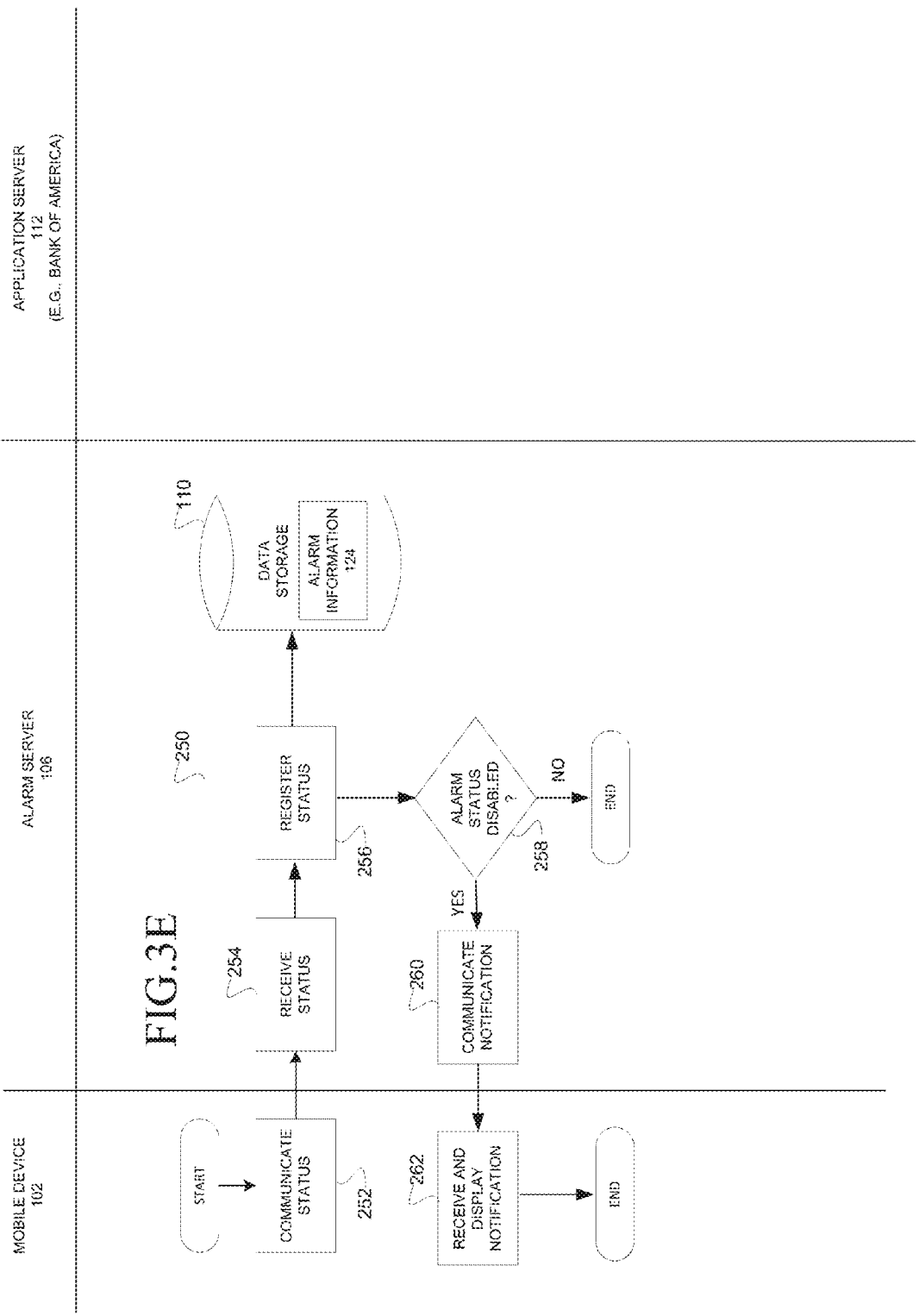

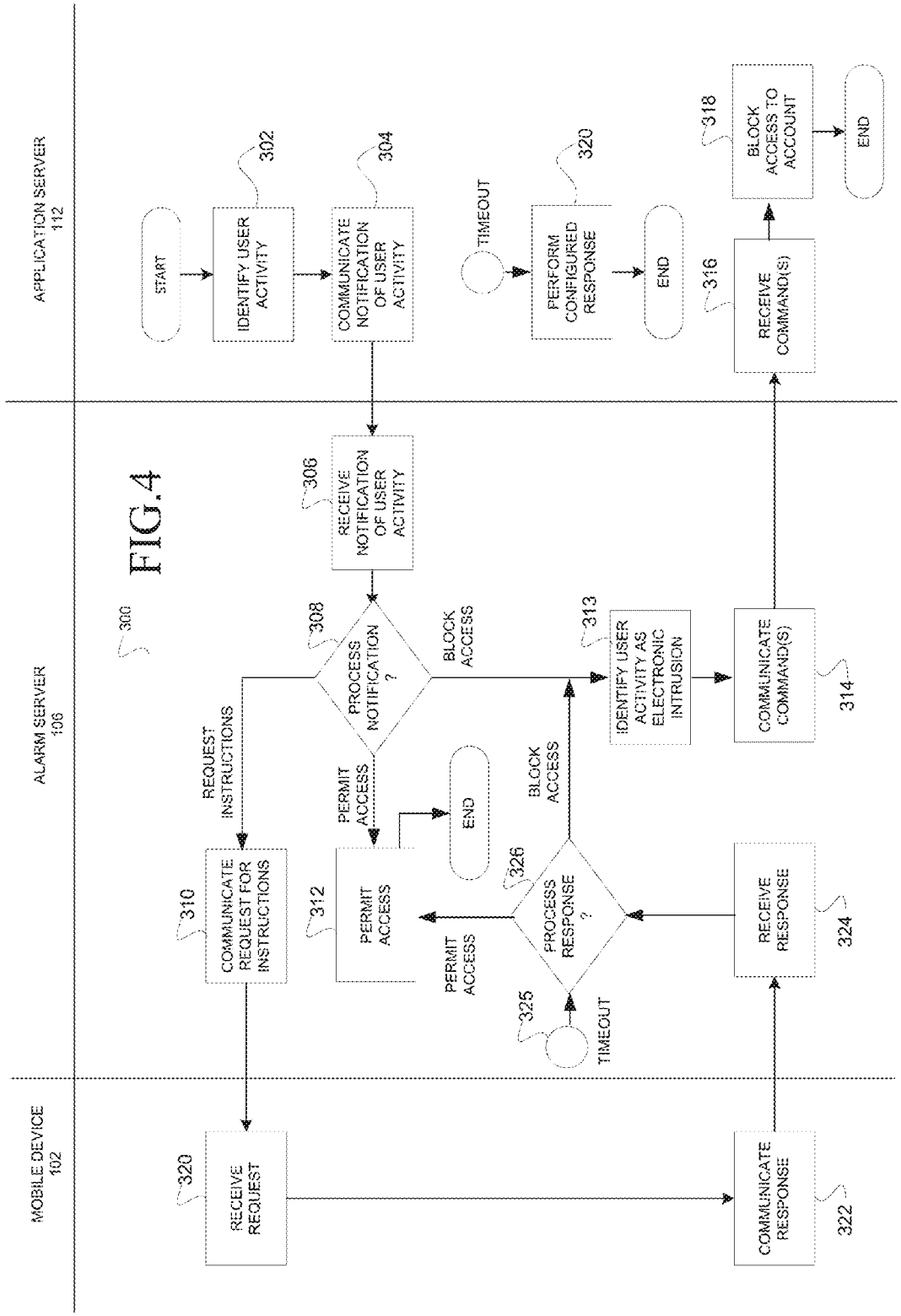

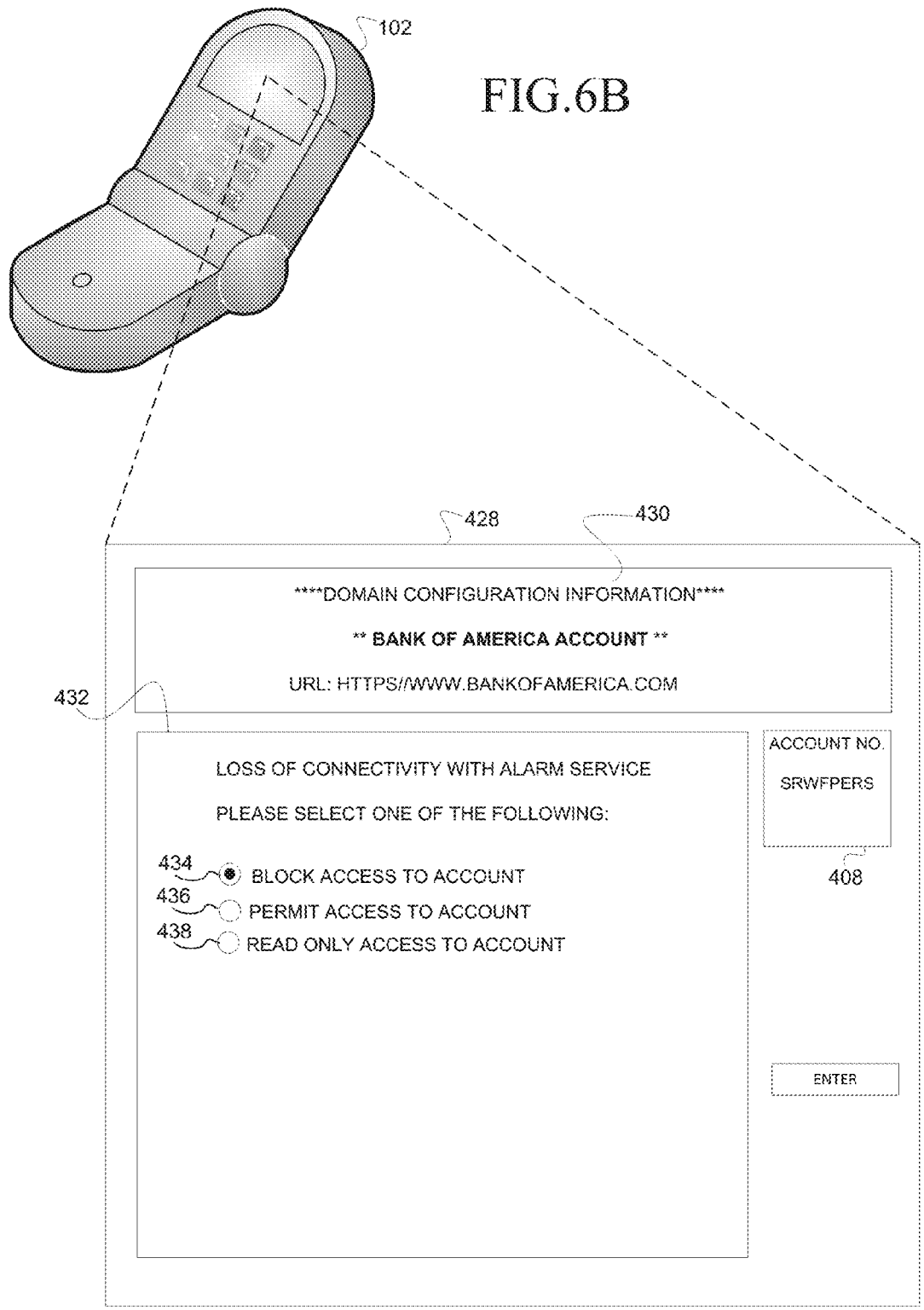

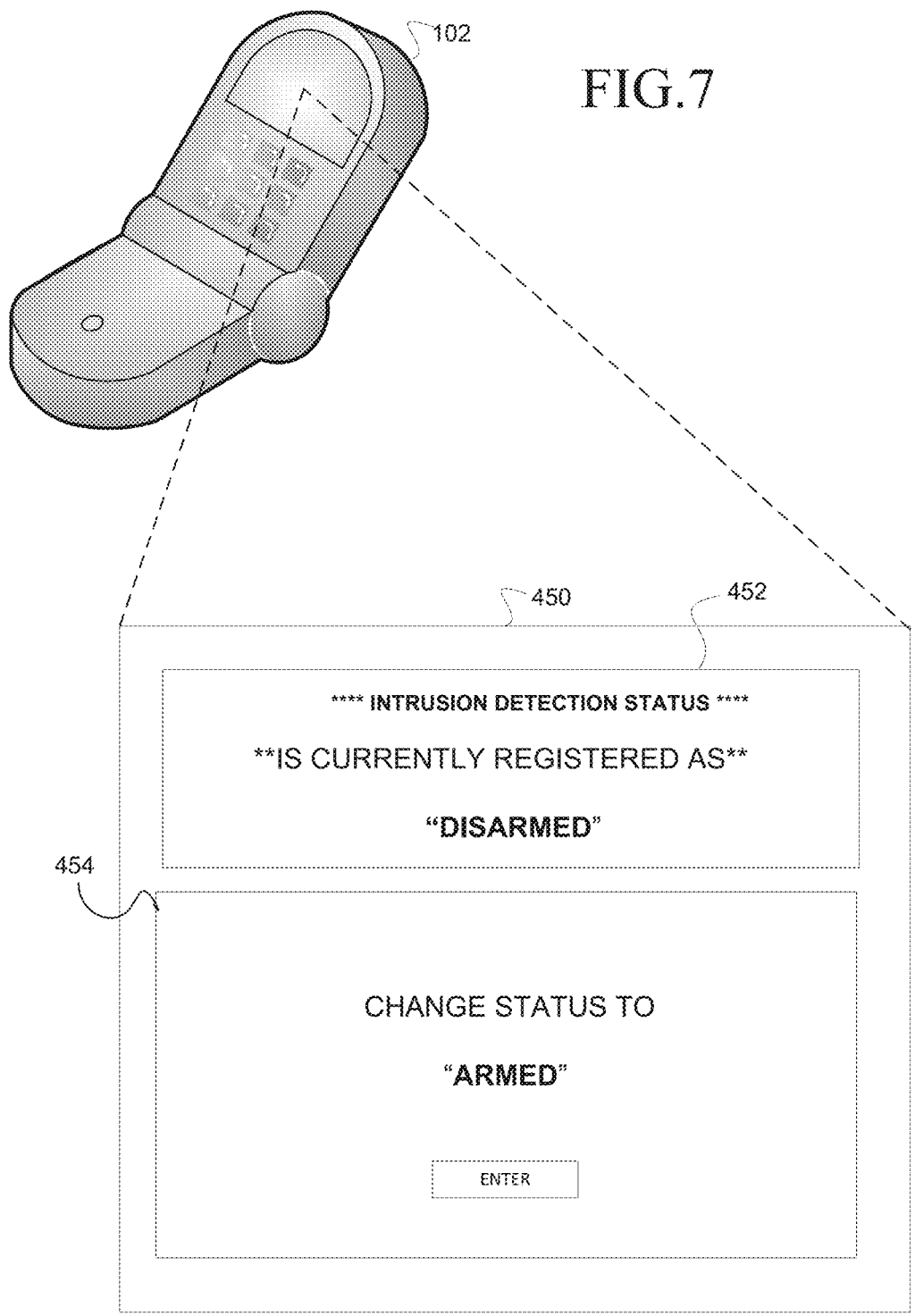

METHODS AND SYSTEMS FOR DETECTING AN ELECTRONIC INTRUSION

RELATED APPLICATIONS

This application is a continuation of U.S. patent application Ser. No. 14/966,506, filed Dec. 11, 2015, which is a continuation of U.S. patent application Ser. No. 13/670,887, filed Nov. 7, 2012, now U.S. Pat. No. 9,213,833, the benefit of priority of each of which is claimed hereby, and each of which are incorporated by reference herein in its entirety.

TECHNICAL FIELD

This disclosure relates to methods and systems supporting data communication systems. More particularly, methods and systems for detecting an electronic intrusion are described.

RELATED ART

A user may operate a client machine to configure, disarm and alarm a surveillance system that protects their home from an unwanted intrusion. In some instances, the user may configure domains in the home differently in accordance with whether the user is away from the home or at home but only utilizing some of the rooms in the home.

BRIEF DESCRIPTION OF THE DRAWINGS

Embodiments are illustrated by way of example and not limitation in the figures of the accompanying drawings, in which:

FIG. 3A illustrates a swim flow chart of a method to register a service provider with an alarm service, according to an embodiment;

FIG. 3B illustrates a swim flow chart of a method to register a user with an alarm service, according to an embodiment;

FIG. 3E illustrates a flow chart of a method to configure a status and receive a notification, according to an embodiment;

FIG. 4 illustrates a swim flow chart of a method to detect an electronic intrusion, according to an embodiment;

FIGS. 6A, 6B, and 7-9 illustrate various user interfaces, according to an embodiment.

DETAILED DESCRIPTION

In the following description, for purposes of explanation, numerous specific details are set forth in order to provide a thorough understanding of some example embodiments. It will be evident, however, to one of ordinary skill in the art that embodiments of the present disclosure may be practiced without these specific details.

As described further below, according to various example embodiments of the disclosed subject matter described and claimed herein, methods and systems for detection of an electronic intrusion are provided. Various embodiments are described below in connection with the figures provided herein.

Figure 1:
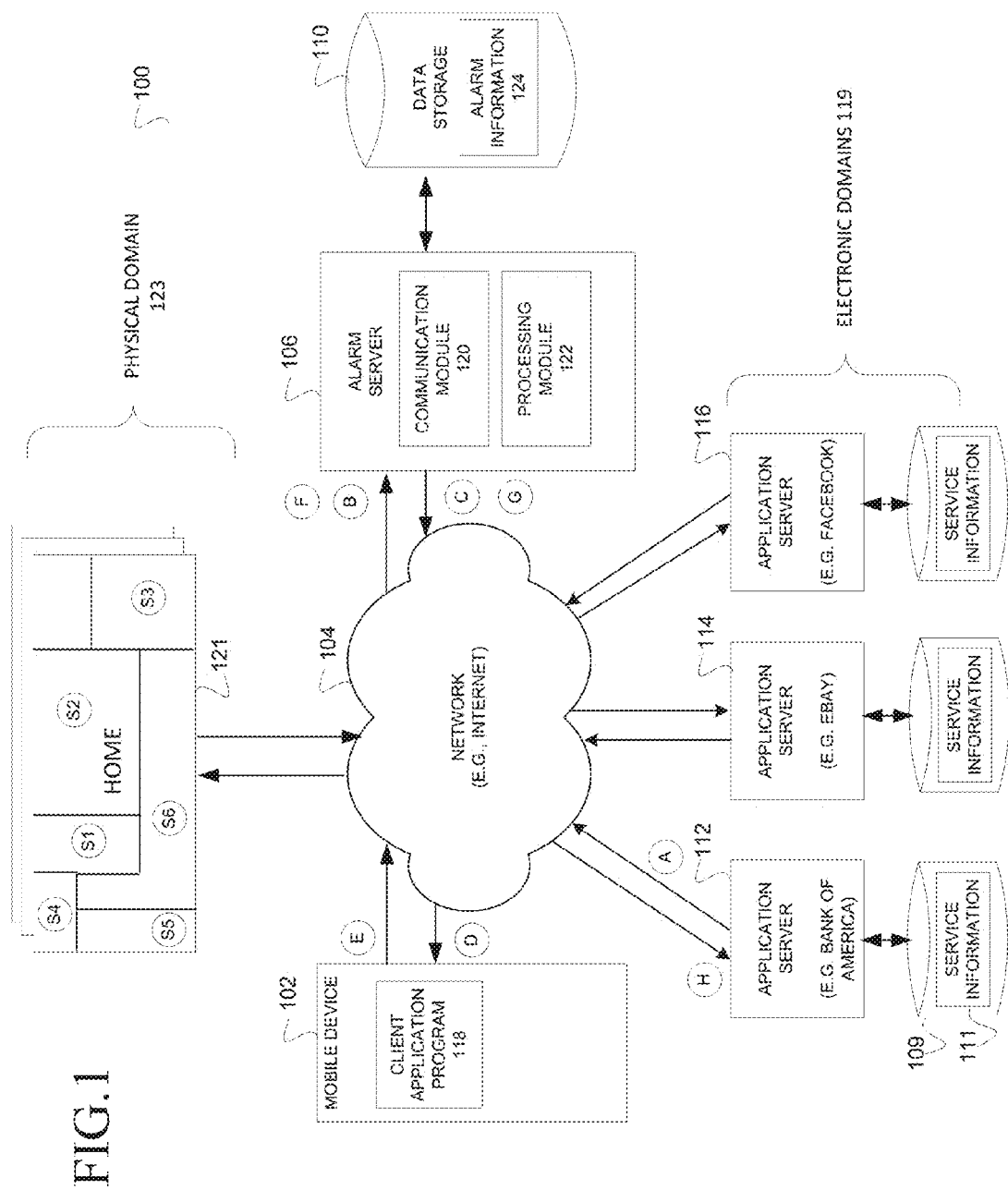
FIG. 1 illustrates a system to detect an electronic intrusion, according to an embodiment.

FIG. 1 illustrates a system 100 to detect an electronic intrusion, according to an embodiment. Broadly, the system 100, at operation "A," is shown to include an application server 112 that may communicate a notification over a network 104 to an alarm server 106 responsive to the identification of an activity. In the present example, the application server 112 is communicating a notification of user activity in the form of a user signing-in to an account. The web-site may, for example, provide banking services including a checking account, as provided by Bank of America Corporation, according to an embodiment. At operation "B," the alarm server 106 may receive the notification of a possible electronic intrusion and associate the notification with an account that is associated with a mobile device 102 (e.g., digital phone) that is associated with a user. At operation "C," the alarm server 106 may communicate a request, over the network 104, to the mobile device 102 to request instructions from the user. At operation "D," the mobile device 102 may receive and display the request. The request may include alert information that alerts the user of a possible intrusion into their Bank of America checking account and requests the user to provide instructions. For example, the request may enquire whether the user wants to block access to the account or, alternately, permit access to the account. In the present example, the user may select a radio button requesting the system 100 to block access to the account. At operation "E," the mobile device 102 may communicate a response that includes instruction information that includes instructions, over the network 104, to the alarm server 106. At operation "F" the alarm server 106 may receive the response and, at operation "G," communicate the response, over the network 104, to the application server 112, the response including instructions to block access to the account. At operation "H," the application server 112 may receive the response and utilize the instructions to block access to the account.

The alarm server 106 is illustrated to further monitor for a possible electronic intrusion at the application server 114 hosting an eBay account for the user as provided by eBay Inc. of San Jose, Calif., and the application server 116 hosting a Facebook account for the user as provided by Facebook Inc. of Menlo Park, Calif. Each of the application servers 112, 114, 116 is further shown to persistently store service information 111 on data storage 109. The service information 111 may be utilized to interact with the alarm server 106.

Accordingly, the application servers 112, 114 and 116 may monitor and report activity in an electronic domain 119 (e.g., user account associated with a particular service provider) that may constitute an electronic intrusion into the electronic domain 119. It will be appreciated by one skilled in the art that the electronic domains 119 may also be embodied as some other logical construct hosted by the application servers 112, 114, and 116 and associated with the user.

The system 100 is further shown to include multiple buildings 121 (e.g., homes, businesses, etc.) that respectively include sensors S1, S2, S3, S4, S5, and S6 that are positioned in different rooms. The sensors (e.g., S1-S6) may be utilized for the monitoring of physical domains 123. Accordingly, the system 100 may be utilized for the monitoring of physical domains 123 and electronic domains 119 thereby providing a centralized and integrated detection of unwanted electronic or physical intrusion.

The system 100 is further shown to include data storage 110 (e.g., hard disk, optical disk, etc.) that is communicatively coupled to the alarm server 106 and utilized to persistently store alarm information 124. The alarm information 124 may be utilized to store information for each user of the alarm server 106, as described later in this document. The mobile device 102 may include a client application program 118 that may be utilized to communicate with the alarm server 106 and the application servers 112, 114, and 116. According to one embodiment, the client application program 118 may be downloaded as an "app" to the mobile device 102 (e.g., digital phone). According to another embodiment the client application program 118 may be specialized for each of service providers (e.g., Bank of America, eBay, Facebook) being hosted by the application servers 112, 114 and 116. Accordingly, the mobile device 102 may store multiple "apps" that are utilized to interact with different services.

The alarm server 106 may include a communication module 120 and a processing module 122. The communication module 120 may be utilized to communicate with the mobile device 102, the application servers 112, 114, and 116, and the buildings 121. The processing module 122 may be utilized to process and store information.

Figure 2A:
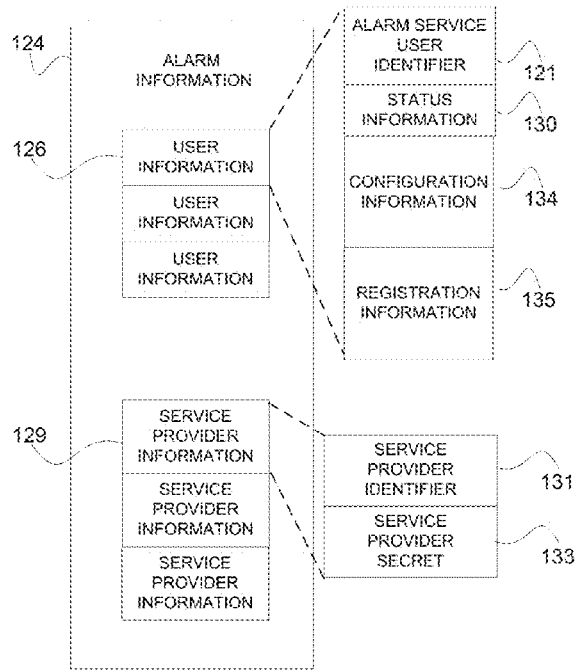
FIG. 2A illustrates alarm information, according to an embodiment.

FIG. 2A illustrates alarm information 124, according to an embodiment. The alarm information 124 may be persistently stored in data storage 110 that is coupled to an alarm server 106. The alarm information 124 may include user information 126 for each user that utilizes the alarm server 106 and service provider information 129 for each service provider (e.g., Bank of America, eBay, Facebook) that utilizes the alarm server 106. The user information 126 may include an alarm service user identifier 121 that is assigned by an alarm service and uniquely identifies the user from other users who utilize the services of the alarm service, status information 130 that may store an alarm status (e.g., "Armed"/"Disarmed") and a location status ("Home"/"Away") that is globally applied across all of the physical domains 123 and electronic domains 119, configuration information 134 that may store information associated with the set of service providers the user wishes to monitor for possible intrusions (see FIG. 2B), and registration information 135 that may store personal information, identification information, and authentication information that uniquely identifies the user from other users registered with the alarm server 106. For example, the personal information may include a mobile telephone number. The status information 130, configuration information 134, and registration information 135 may be configured by the user from a client machine 103 (not shown) and/or the mobile device 102. The service provider information 129 may be configured by a service provider (e.g., Bank of America, eBay, Facebook) using an interface that may be provided by the alarm server 106 or generated by the alarm server 106. For example, the service provider identifier 131 and the service provider secret may be generated by the alarm server 106 for a particular service provider responsive to the service provider registering with the alarm server 106. The service provider identifier 131 may be utilized by the alarm server 106 to uniquely identify the service provider. The service provider secret 133 may be utilized by the alarm server 106 to authenticate an entity that claims to be the service provider by presenting for authentication the service provider identifier 131.

Figure 2B:
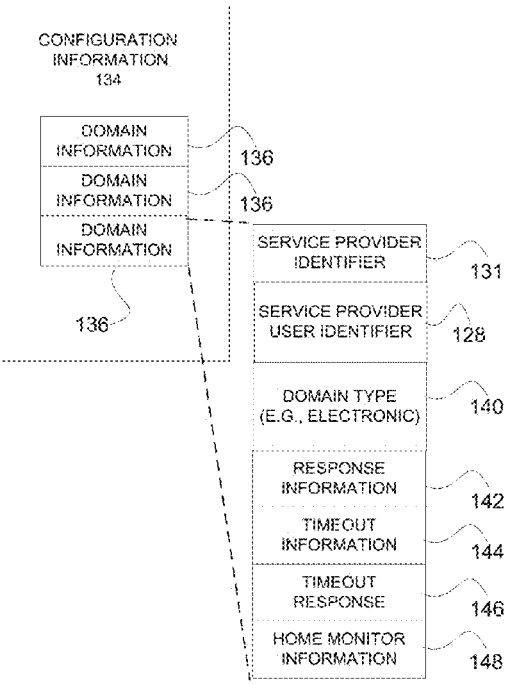
FIG. 2B illustrates configuration information, according to an embodiment.

FIG. 2B illustrates configuration information 134, according to an embodiment. The configuration information 134 may include domain information 136 for each service provider (e.g., Bank of America, eBay, Facebook) that is monitored for the user. The domain information 136 may include a service provider identifier 131, as described, that is associated with the domain, a service provider user identifier 128 that is assigned by a service provider and uniquely identifies the user from other users who utilize the services of the service provider, a domain type 140 that may be utilized to identify the type of domain (e.g., electronic domains 119 in the present example), response information 142, timeout information 144, a timeout response 146, home monitor information 148. The response information 142 may be configured by the user to control the response to a notification of user activity in a domain. For example, in an electronic domain 119, the response information 142 may direct the alarm server 106 to communicate a command to the application server 112 that instructs the application server 112 to block access to an account, immediately shut-down the account or permit access to the account. The response information 142 may also direct the alarm server 106 to communicate a request for instructions to the user associated with the account who may instruct the alarm server 106 to block or permit access to the account. In some embodiments the user may configure the response information 142 to include other options including permitting read-only access to the account or permitting limited access to the account based on functionality. The timeout information 144 and timeout response 146 may be associated with the request for instructions. The timeout information 144 may be configured to define a period of time for the alarm server 106 to wait for instructions from the user (e.g., a timeout). The timeout response 146 may be configured by the user to identify a remedial action in the absence of receiving instructions from the user (e.g., expiration of the timeout information 144). For example, the user may configure the timeout response 146 to block access to the account or permit access to the account. In some embodiments the alarm server 106 may present additional options including permitting read-only access to the account or permitting limited access to the account based on functionality. The home monitor information 148 may be configured by the user to process the notification or permit access to the account. Processing of the notification may enable identification of an electronic intrusion in a particular electronic domain 119 (e.g., Bank of America) notwithstanding an alarm status of "ARMED" and a location status of "HOME," as summarized in the table below:

| Alarm Status | Location Status | Home Monitor Information | Result |
|---|---|---|---|
| "Armed" | "Away" | "N/A" | "Process Notification" |
|  | "Home" | "Enabled" | "Process Notification" |
|  |  | "Disabled" | "Permit Access to Account" |
| "Disarmed" | "N/A" | "N/A" | "Permit Access to Account" |

Figure 2C:
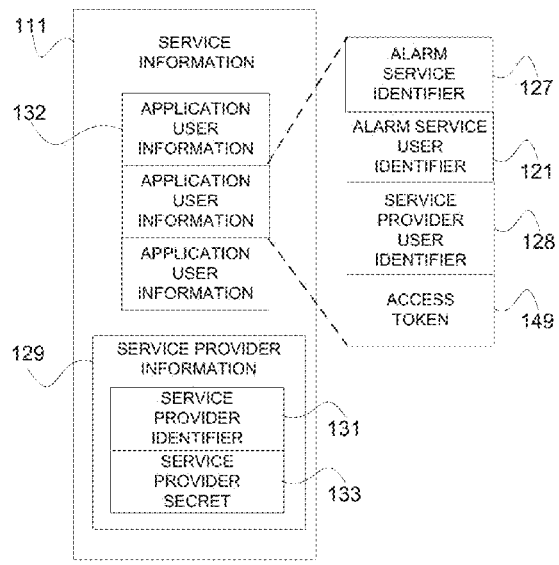
FIG. 2C illustrates service information, according to an embodiment.

FIG. 2C illustrates service information 111, according to an embodiment. The service information 111 may be persistently stored in data storage 109 that is coupled to an application server 112, 114, or 116 that is associated with a service provider (e.g., Bank of America, eBay, Facebook). The service information 111 may include application user information 132 for each user in the application server 112, 114, or 116 that utilizes the alarm service hosted by the alarm server 106 to monitor an electronic domain 119 (e.g., user account). The application user information 132 may include an alarm service identifier 127, an alarm service user identifier 121, the service provider user identifier 128 and an access token 149. The alarm service identifier 127 may uniquely identify an alarm service from other alarm services in the system 100. The service provider user identifier 128 may uniquely identify the user in the application server 112, 114, or 116 that is associated with a service provider (e.g., Bank of America, eBay, Facebook). The access token 149 may be communicated to an alarm server 106 responsive to the application server 112, 114 or 116 identifying an account of a user in which a potential electronic instruction has been detected. The access token 149 may be utilized by the alarm service to identify the alarm service user and to ensure the alarm service user has authorized the service provider (e.g., Bank of America, eBay, or Facebook) to make application programming interface (API) calls to the alarm server 106 on behalf of the alarm ser vice user.

FIG. 3A illustrates a swim flow chart of a method 150 to register a service provider (e.g., Bank of America, eBay, Facebook) with an alarm service, according to an embodiment. Registration may be performed by a service provider administrator. Registration may include registering an account for the service provider with the alarm server 106 and registering the service provider as an application with the alarm server 106. Operations performed by an alarm server 106 that hosts the alarm service are illustrated on the left and operations performed by an application server 112 that hosts the service provider (e.g., Bank of America) are illustrated on the right. The method 150 may commence at operation 151 with the application server 112 communicating a request to the alarm server 106 to register the service provider (e.g., Bank of America).

At operation 153, at the alarm server 106, the communication module 120 may receive the request including service provider information 129 and at operation 155 the processing module 122 may store the service provider information 129 in the data storage 110 in alarm information 124. For example, the service provider registration information may include a service provider name, address, telephone number, email address, etc. In some embodiments, the alarm server 106 may further verify the account by sending an email to the registered email address to ensure the service provider administrator responds to the email.

At operation 157, the application server 112 may communicate a request to the alarm server 106 to register the service provider (e.g., Bank of America) as an application. For example, the request may identify the application server 112 as a client application.

At operation 159, at the alarm server 106, the communication module 120 may receive the request and at operation 161 the processing module 122 may generate a service provider identifier 131 and a service provider secret 133 for the service provider. At operation 163, the processing module 122 may store the service provider identifier 131 and the service provider secret 133 in the appropriate entry of service provider information 129 in the alarm information 124 in the data storage 109. At operation 165, the communication module 120 may communicate the service provider identifier 131 and the service provider secret 133 to the application server 112.

At operation 167, the application server 112 may receive the service provider identifier 131 and the service provider secret 133 and at operation 169 the application server 112 may store the service provider identifier 131 and the service provider secret 133 as service information 111 in the data storage 109. Accordingly, the service provider is now registered with the alarm service.

FIG. 3B illustrates a swim lane flow chart of a method 156 to configure registration information 135 on an alarm server 106, according to an embodiment. The method 156 may be utilized by a user who operates a client machine 103 and/or a mobile device 102 (e.g., digital phone) to register themself with the alarm service. In one embodiment, the client machine 103 may be the same as the mobile device 102. Illustrated on the left are operations that are performed by a client machine 103; illustrated in the middle are operations that are performed by a mobile device 102; and illustrated on the right are operations that are performed by an alarm server 106. The method 156 may commence at operation 158 with the client machine 103 communicating registration information to the alarm server on behalf of a user who wishes to register for the alarm service. For example, the registration information 135 may include personal information describing the user including the name, address, telephone number, mobile telephone number, etc., of the user.

At the alarm server 106, at operation 160, the communication module 120 may receive the registration information 135. At operation 162, the processing module 122 may store information in the alarm information 124 for the user. For example, the processing module 122 may store registration information 135 at the appropriate user information entry 126. For example, the registration information 135 may include the name, address, home telephone number, mobile telephone number, etc. of the user and the alarm service user identifier 121 may be generated by the alarm server 106 and uniquely identify the user in the alarm service. In addition, the processing module 122 may generate an alarm service user identifier 121 to uniquely identify the user in the alarm server 106 and store the alarm service user identifier 121 in the alarm information 124. At operation 164, the processing module 122 may generate a verification code and at operation 164 communicate the verification code to the mobile device 102 based on the mobile telephone number provided by the user. The alarm server 106 may send the verification code to the mobile device 102 to authenticate that the identified mobile device 102 is associated with the user that is registering. At operation 166, the mobile device 102 may receive and display the verification code on a screen.

At the client machine 103, at operation 168, the user may read the verification code from the screen of the mobile device 102 and enter the verification code into a user interface on the client machine 103 to communicate the verification code to the alarm server 106.

At the alarm server 106, at operation 170, the communication module 120 may receive the verification code and at operation 172, the processing module 122 may authenticate the verification code. For example, the processing module 122 may authenticate that the received verification code matches the verification code sent to the mobile device 102. At operation 174, the communication module 120 may communicate a message to the client machine 103 indicating that the verification code was properly authenticated.

Figure 3C:
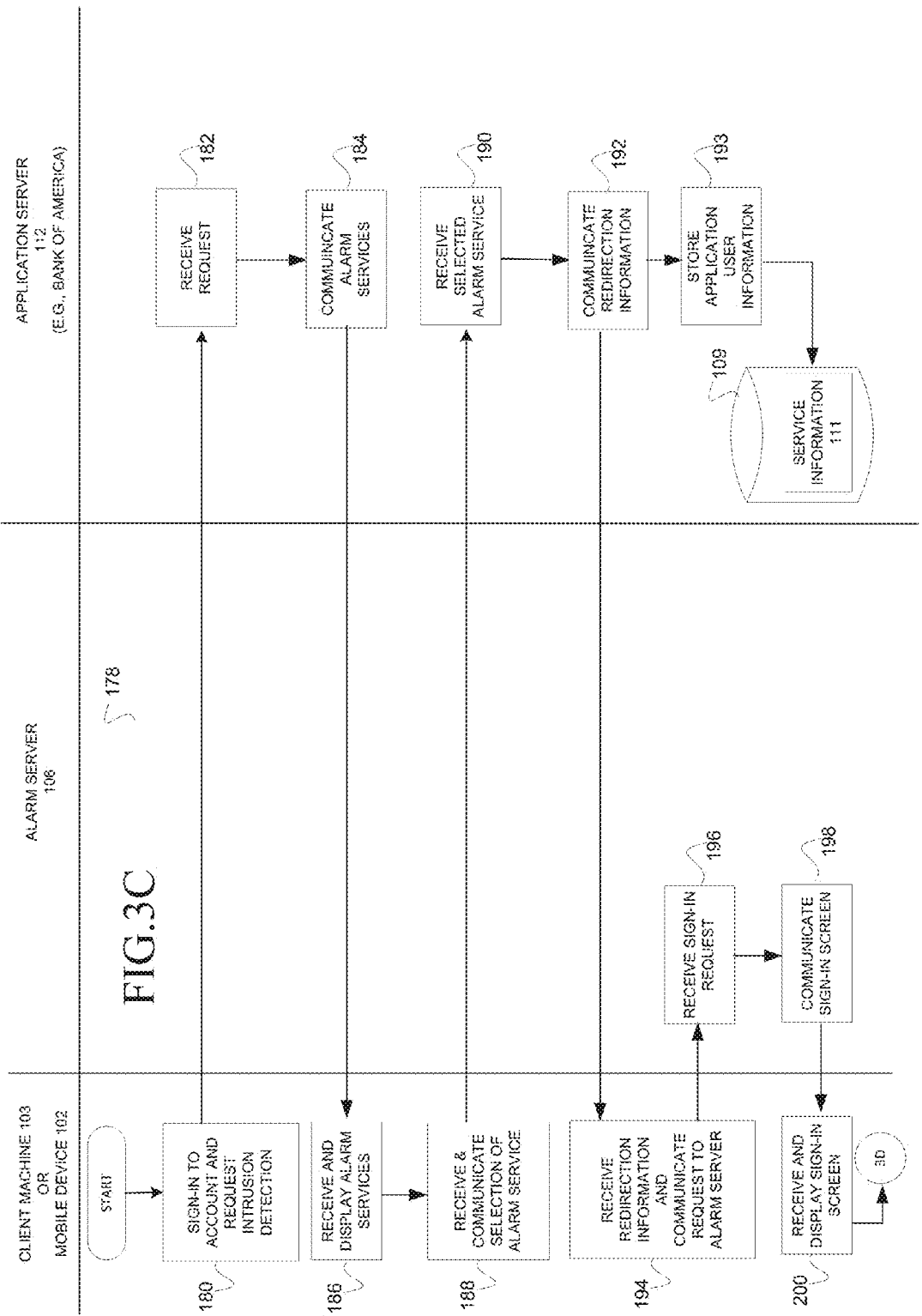
FIGS. 3C and 3D illustrate a swim flow chart of a method to configure an account for intrusion detection, according to an embodiment.

FIG. 3C illustrates a swim lane flow chart of a method 178 to configure an account for intrusion detection, according to an embodiment. Illustrated on the left are operations that may be performed by the mobile device 102 or client machine 103; illustrated in the middle are operations that may be performed by the alarm server 106; and illustrated on the right are operations that may be performed by an application server (e.g., 112, 114, or 116). The method 178 may utilize a single user sign-on protocol as is known by those skilled in the art. The method 178 may commence at operation 180 with a user who is operating the client machine 103 signing into an account hosted by the application server 112 (e.g., Bank of America) and requesting intrusion detection for the account causing the client machine 103 to communicate a request for intrusion detection to the application server 112.

At operation 182, the application server 112 may receive the request and identify the request as originating from a user associated with a particular the service provider user identifier 128 based on the credentials (e.g., username, password) provided at sign-in. At operation 184, the application server 112 may communicate a user interface that enables the user to select one alarm service from multiple alarm services that provide electronic intrusion detection services.

At operation 186, at the client machine 103, the user interface may be received and displayed. At operation 188, the client machine 103 may receive a selection from the user that identifies a particular alarm service and at operation 188 communicate the selection to the application server 112. At operation 190, the application server 112 may receive the selection of the particular alarm service and at operation 192 communicate the redirection information to the client machine 103. The redirection information may cause the client machine 103 to redirect to the alarm server 106 that corresponds to the selected alarm service. The redirection information may include the service provider user identifier 128, the service provider identifier 131, the service provider secret 133, and a first universal resource locator (URL) that identifies a landing page of an alarm server 106 for the selected alarm service.

Redirection In formation—Operation 192—Application Server 112 to CM 103
  service provider user identifier 128
  service provider identifier 131
  service provider secret 133
  first universal resource locator (URL)—LP on the alarm server 106

At operation 193, the application server 112 may store an alarm, service identifier 127 that corresponds to the selected alarm service in the appropriate application user information 132 that is associated with the user who is operating the client machine 103. The alarm service identifier 127 may subsequently be used to communicate notices of potential electronic intrusions to the alarm server 106 that hosts the selected alarm service.

At operation 194, the client machine 103 may receive the redirection information and communicate a request to the first URL that facilitates a sign-in to the alarm server 106. Recall the first URL was received as redirection information from the application server 112 and identifies the landing page on the alarm server 106.

At operation 196, at the alarm server 106, the communication module 120 may receive the request and at operation 198 communicate one or more user interfaces to the client machine 103 to facilitate signing-in to the application server.

Figure 3D:
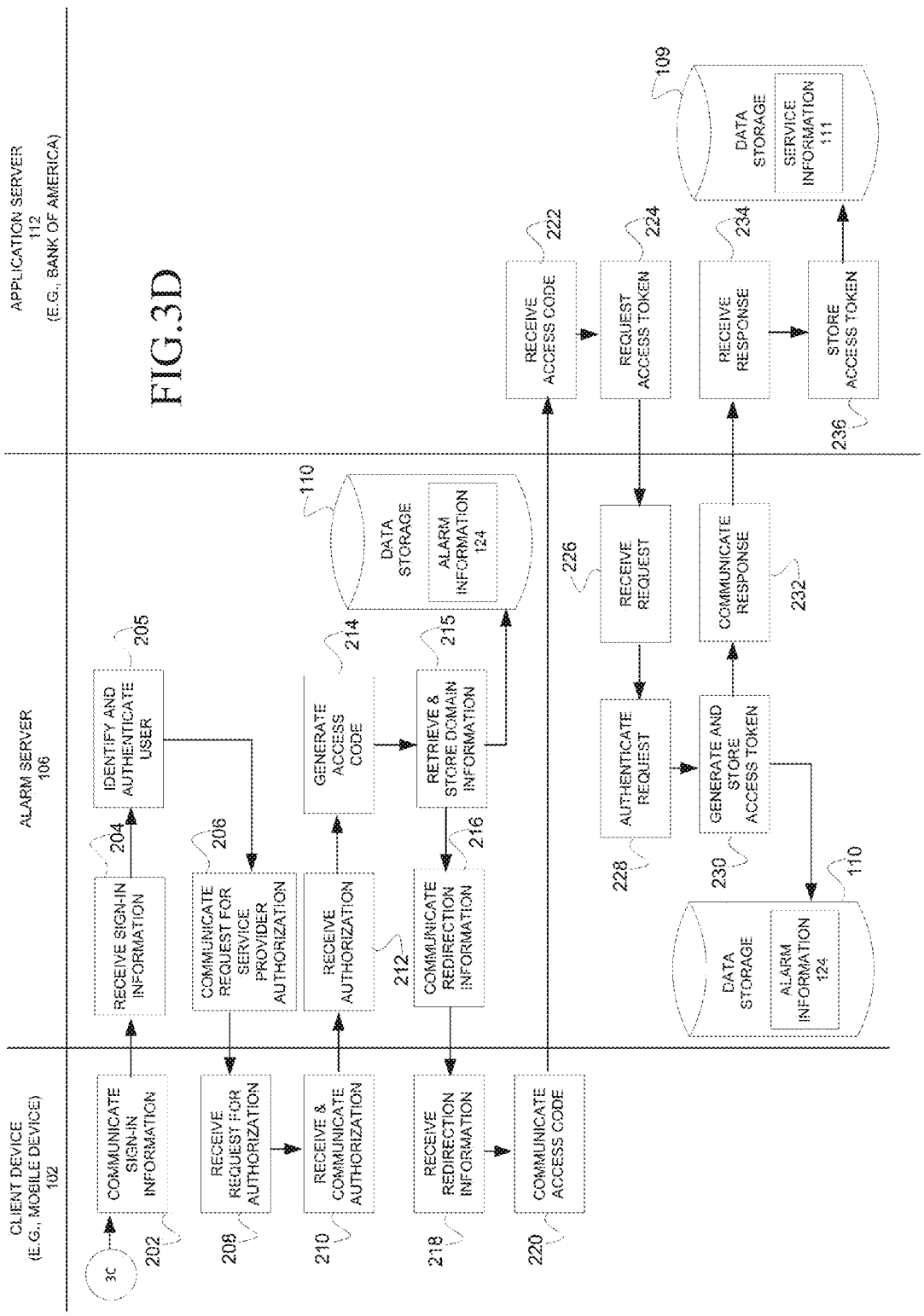

At operation 200, the client machine may receive and display the sign-in screen and processing continues at operation 202 on FIG. 3D.

FIG. 3D illustrates a swim lane flow chart of a method 178 to configure an account for intrusion detection, according to an embodiment. It is a continuation from FIG. 3C. Illustrated on the left are operations that are performed by the client machine 103 (e.g., mobile device); illustrated in the middle are operations that are performed by the alarm server 106; and illustrated on the right are operations that are performed by an application server (e.g., 112, 114, or 116). The method 178 is continued from FIG. 3C at operation 202 with the client machine 103 communicating sign-in information to the alarm server 106. At operation 204, at the alarm server 106, the communication module 120 may receive the sign-in information and at operation 205 the processing module 122 may authenticate the user. For example, the alarm server 106 may recognize the user as having previously registered with the alarm service based on the sign-on information as described in method 156 on FIG. 3B. Otherwise the alarm server 106 may substantially execute the method 156 on FIG. 3B continuing at operation 206 once the registration and authentication are complete. At operation 206, the communication module 120 may communicate a request, on behalf of the service provider, to the client machine 103 to authorize API calls to the alarm service. For example, the alarm server 106 may communicate a request to the client machine 103 requesting the user to provide authorization for the identified service provider to make API calls to the alarm server 106 (e.g., communicating a notice of potential electronic intrusion).

At operation 208, the mobile device 102, may receive the request for authorization and, at operation 210 receive and communicate authorization from the user to the alarm server 106.

At operation 212, the alarm server 106, may receive the authorization and at operation 214 the processing module 122 generates an access code to enable the application server 112 to make an API call to the alarm server 106 on behalf of the user. At operation 215, the processing module 122 may retrieve and store domain information 136 for the user. For example, the processing module 122 may store the service provider identifier 131, the service provider user identifier 128, and the domain type 140 (e.g., electronic) in the corresponding domain information 136 for the user in the configuration information 134 on the alarm server 106. The communication module 120 may further communicate user interfaces (e.g., FIG. 6) to the client machine 103 (not shown) to retrieve and store configuration information 134 in the form of response information 142, timeout information 144, a timeout response 146 and home monitor information 148. At operation 216, the communication module 120 may communicate redirection information to the client machine 103 to redirect the client machine 103 back to the application server 112. For example, the redirection information may include a second URL identifying a landing page on the application server 112, the alarm service user identifier 121, and the access code.

Redirection Information—Operation 216—Alarm Server 106 to CM 103
  second URL identifying a landing page on the application server 112
  alarm service user identifier 121
  access code At operation 218, the client machine 103 may receive the redirection information and at operation 220, the client machine 103 may utilize the second URL to retrieve a landing page on the application server 112. In one embodiment the second URL may be appended with the alarm service user identifier 121 and the access code to the application server 112.

At operation 222, the application server 112 may receive the access code and the alarm service user identifier 121 along with the request for the landing page identified by the second URL. At operation 224, the application server 112 may communicate a request for an access token 149 to the alarm server 106, the request including the access code, the service provider identifier 131 and the service provider secret 133.

At operation 226, at the alarm server 106, the communication module 120 may receive the request for the access token 149. At operation 228, the processing module 122 may authenticate the request based on the service provider identifier 131 and the service provider secret 133. Additionally, the processing module 122 may validate the access token provided in the request was assigned for a user belonging to the specific service provider identified by the service provider identifier 131. At operation 230, the processing module 122 may generate the access token based on the access code and store the access token in the alarm information 124. At operation 232, the communication module 120 may communicate a response including the access token 149 to the application server 112. The response may further include the service provider user identifier 128 associated with the user, and the alarm service identifier 127 associated with the alarm service and the alarm service user identifier 121 that identifies the user on the alarm service.

At operation 234, the application server 112 may receive the access token 149 and at operation 236, the processing module 122 may store the access token 149, the alarm service identifier 127 and the alarm service user identifier 121 in the service information 111 in the data storage 109 that is coupled to the application server 112.

FIG. 3E illustrates a swim lane flow chart of a method 250 to configure a status and receive a notification, according to an embodiment. Illustrated on the left are operations that are performed by the mobile device 102; and illustrated in the middle are operations that are performed by the alarm server 106. The method 250 may commence at operation 252 with the mobile device 102 communicating status information 130 (e.g., ("Armed"/"Disarmed") (See FIG. 7) and/or ("Home"/"Away") (See FIG. 8)) to the alarm server 106. For example, the user may navigate user interfaces and select radio buttons to identify status information 130 that is communicated to the alarm server 106. At operation 254, the communication module 120 at the alarm server 106 may receive the status information 130 and, at operation 256, the processing module 122 may register the status by storing the status information 130 in the alarm information 124 in the data storage 110. At decision operation 258, the processing module 122 may identify whether the alarm status was disarmed. For example, if the communication status information 130 was configured to the "Disarmed" status then processing continues at operation 260. At operation 260, the communication module 120 may communicate a notification to the mobile device 102 that notifies the user that their alarm service was disarmed.

At operation 262, the mobile device 102 may receive and display the notification and the process ends.

FIG. 4 illustrates a swim lane flow chart of a method 300 to detect an electronic intrusion, according to an embodiment. Illustrated on the left are operations performed by the mobile device 102; illustrated in the middle are operations performed by the alarm server 106; and illustrated on the right are operations performed by the application server 112 (e.g., Bank of America). The method 300 commences at operation 302 with the application server 112, 114, 116 identifying an activity (e.g., user activity). For example, the application server 112 may identify a user activity in the form of a user who signs-on to a user account. In other embodiments other user activities or more than a single user activity may be detected and communicated as a single notification to the alarm server 106. For example, user activities may include a request to purchase (e.g., an item or service), submission of a bid, communication of a message, a post of a publication, a request to transfer funds, a request to configure a feature, etc. In some embodiments the user activity may be associated with an item that takes various forms. For example, the item may include a financial instrument including a bond, a durable good including an automobile, or a staple good including soap. In some embodiments the detected activity may not include a user but rather account activity. For example, the activity detected may include an electronic debit, credit, or enquiry. At operation 304, the application server 112 may communicate the notification to the alarm server 106 associated with the alarm service identifier 127 and set a timeout for a response. According to one embodiment, the notification may include a service provider identifier 131 that identifies the application server 112 (e.g., Bank of America), service provider user identifier 128, alarm service user identifier 121, an access token 149 that identifies the user account at the alarm server 106, and an activity information that includes an activity identifier that identifies the activity. For example, the activity identifier may identify a sign-on, a payment, an addition of a credit card, a deletion of a credit card, placing a bid, changing a password, an update of a configurable parameter, the addition of a service, a credit, a debit or some other type of activity.

At operation 306, at the alarm server 106, the communication module 120 may receive the notification of a possible electronic intrusion in the form of an activity (e.g., user activity). At operation 308 the processing module 122 may process the notification as illustrated and described more fully in FIG. 5. For example, the processing module 122 may identify whether to communicate a request to the user for instructions, to respond back to application server 112 with instructions to permit access to the account or to respond back to application server 112 with instructions to block access to the account. If the processing module 122 determines to request instructions from the user, then processing may continue at operation 310. If the processing module 122 determines that access to the account is to be permitted without further action, then processing may continue at operation 312. At operation 312, in one embodiment (not shown), a command is communicated to the application server 112 indicating the alarm server 106 is permitting the access to the account. If the processing module 122 determines to block access to the account, then processing may continue at operation 313. At operation 310 the communication module 120 may communicate a request for instructions to the mobile device 102. For example, the request may include a service provider identifier 131 that identifies the service provider (e.g., Bank of America) and the user account where the user activity was detected and a request for instructions from the user. The request may include whether to block access to the account or permit access to the account. In another embodiment the request for instructions may further include an instruction to shut down the account. In one embodiment the request may be displayed on a user interface of a mobile device 102, as illustrated and described in FIG. 9.

At operation 320, at the mobile device 102, the client application program 118 may receive and display the request for instructions to the user. At operation 322, the client application program 118 may receive a selection from the user and communicate the selection in a response to the alarm server 106. For example, the selection may identify that the alarm server 106 should return instructions to application server 112, 114, 116 associated with the service provider to block access to the account.

At operation 324, at the alarm server 106, the communication module 120 may receive the response. At operation 325, the communication module may identify a timeout in the absence of receiving the response. At decision operation 326, the processing module 122 may process the response or the timeout. If the processing module 122 identifies a response that includes instructions in the form of a selection to permit access to the account, then the processing continues at operation 312. If the processing module 122 identifies a response that includes instructions in the form of a selection to block access to the account, then processing continues at operation 313. If the processing module 122 identifies a timeout then processing continues based on the timeout response 146 for the electronic domain 119, as configured by the user. For example, the processing may continue at operation 312 to permit access to the account or the processing may continue at operation 313 to block access to the account. Other embodiments may include additional selections as being available to the user (e.g., shut down the account, permit read-only access to the account). At operation 313, the processing module 122 may identify the user activity on the first account as an electronic intrusion into the first account. At operation 314, the communication module 120 may return the response (permit access, block access, etc.,) to the application server 112 in response to the notification of user activity received in operation 306.

At operation 316, the application server 112 may receive the command information, and at operation 318 the application server 112 may block access to the account. For example, the application server 112 may sign-off the user without warning the user. In some embodiments, the application server 112 may flag the user's account as having been taken over by a hacker.

At operation 320, the application server 112 detects a timeout on the notification communicated in operation 304 and responds to the timeout by performing a configured response. For example, the application server 112 may respond in accordance with configuration provided by a user, as illustrated in FIG. 6B, to block access to the account, permit access to the account or provide restricted access to the account.

In another embodiment the service provider may immediately respond to a detected activity if a user has configured the alarm service to immediately permit or block access to an account. For example, the alarm server 106 may communicate the response information 142 (e.g., block or permit access) to the application server 112, 114 or 116, that, in turn, may utilize the response information 142 to immediately respond to a detection of an activity in the account by blocking or permitting access to the account. This embodiment would further utilize a reverse authorization flow where the user authorizes the alarm service to make API calls to the service provider on behalf of the user.

Figure 5:
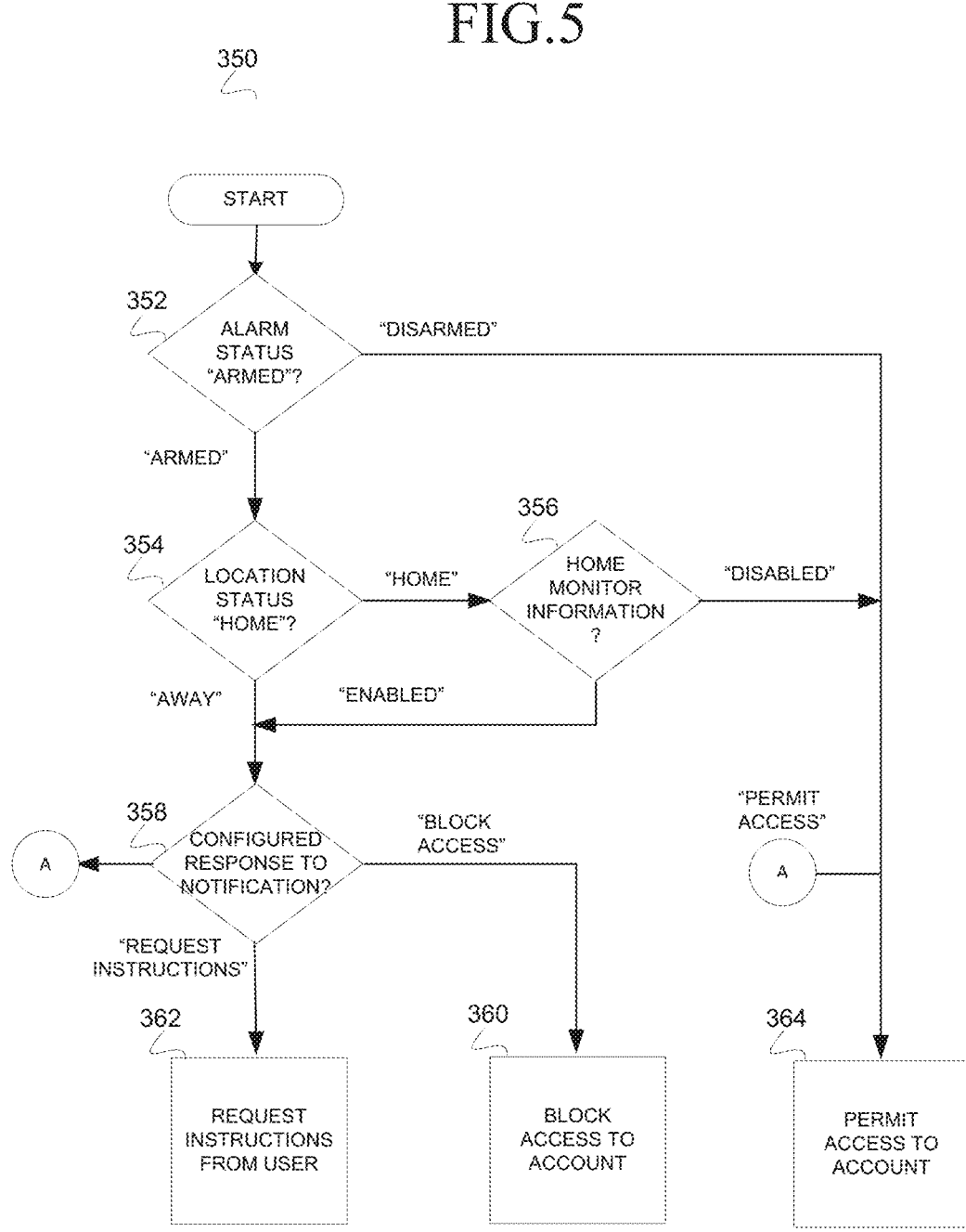
FIG. 5 illustrates a flow chart of a method to process an electronic notification of a possible electronic intrusion, according to an embodiment.

FIG. 5 illustrates a flow chart of a method 350 to process an electronic notification of a possible electronic intrusion, according to an embodiment. The method 350 may execute at the alarm server 106 responsive to a receipt of a notification of user activity from an application server including application servers 112, 114 or 116. The method 350 may commence at decision operation 352 with the processing module 122 identifying whether the alarm status in the status information 130 is "ARMED" or "DISARMED." If the alarm status is "DISARMED" then processing continues at operation 364, as further described in operation 312 of FIG. 4. If the alarm status is "ARMED" then processing continues at decision operation 354. At decision operation 354 the processing module 122 may identify whether the location status in the status information 130 is "AWAY" or "HOME." If the location status is "AWAY" then processing may continue at decision operation 358. If the location status is "HOME" then processing may continue at decision operation 356. At decision operation 356, the processing module 122 may identify whether the home monitor information 148 is configured as "Enabled" or "Disabled." If the home monitor information 148 is configured as "Disabled" then processing continues at operation 364 to permit access to the account, as further described in operation 312 of FIG. 4. If the home monitor information 148 is configured as "Enabled" then processing continues at operation 358 to further process the notification. At decision operation 358 the processing module 122 may identify whether the response information 142 is configured to direct the alarm server 106 to block access to an account, permit access to the account, or communicate a request for instructions to the user. If the response information 142 is configured to block access to the account then processing may continue at operation 360 on FIG. 5, as further described in operation 313 of FIG. 4. If the response information 142 is configured to request instructions from the user then processing may continue at operation 362 on FIG. 5, as further described in operation 310 of FIG. 4. In some embodiments the response information 142 may further be configured to shut down the account.

Figure 6A:
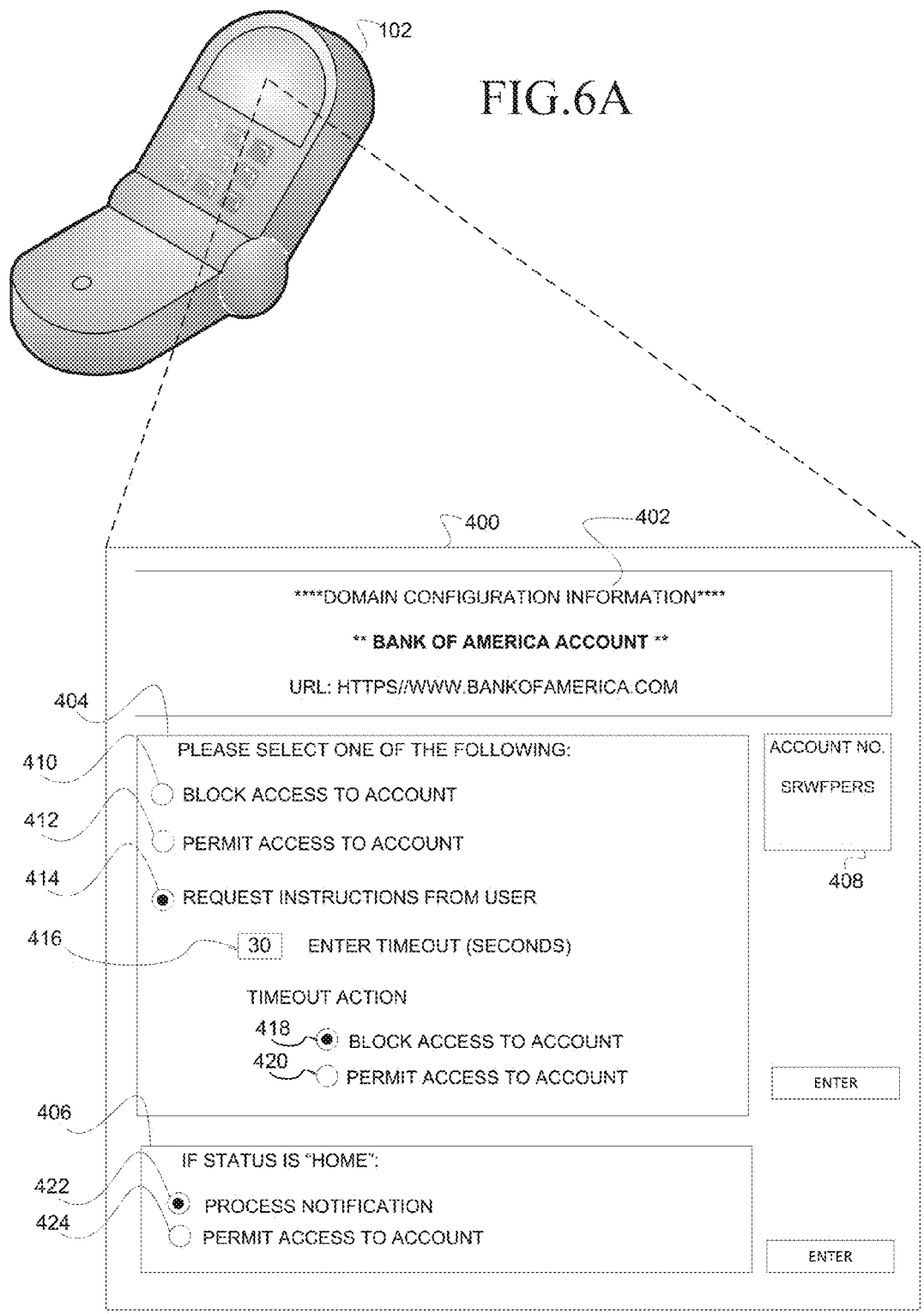

FIG. 6A illustrates a user interface 400, according to an embodiment. The user interface 400 may be displayed on the mobile device 102 (e.g., mobile telephone). The user interface 400 may be communicated from an alarm server 106 to the mobile device 102. The user interface 400 may be communicated to enable a user to configure processing on the alarm server 106 in response to receipt of the notification of user activity in the electronic domain 119 (e.g., account at the service provider). The user interface 400 may include an account panel 402, a configuration panel 404, a configuration panel 406, and an account login identifier 408. The account panel 402 and the account login 408 may display information that identifies the service provider associated with the application server and the account respectively. For example, the account panel 402 may include the name and universal resource locator of the service provider, and the account login identifier 408 may identify the particular account. The configuration panel 404 may receive selections from the user to configure processing in response to a notification of user activity in the identified account at the identified service provider. Callouts 410, 412 and 414 identify mutually exclusive processing in response to receipt of the notification. The callout 410 identifies a radio button that may be selected by the user to respond to the application server 112, 114, 116 with instructions to block access to the account responsive to receipt of a notification of user activity in the identified account. The callout 412 identifies a radio button that may be selected by the user to respond to the application server 112, 114, 116 with instructions to permit access to the account responsive to receipt of the notification. The callout 414 identifies a radio button that may be selected by the user to request instructions from the user responsive to receipt of the notification. In this scenario, the action (block access, permit access) selected by the user will be communicated back to the application server 112, 114, 116. The callouts 416, 418 and 420 are associated with the request for instructions from the user and are selectable in conjunction with this feature. The callout 416 identifies an input box that receives a quantity of time that is used to time out the request for instructions from the user. For example, if the quantify of time has elapsed and a response including instructions have not been received from the user, then the processing module 122 may communicate a command message including command information in accordance with the radio button at callout 418 to block access to the account or in accordance with the radio button at callout 420 to permit access to the account. The configuration panel 406 identifies mutually exclusive processing that may be selected in response to receipt of the notification of user activity in the electronic domain 119 (e.g., account at the service provider) with a user status of "HOME." The callout 422 identifies a radio button that may be selected by the user to process a notification of user activity notwithstanding a user status of "HOME." The callout 424 identifies a radio button that may be selected by the user to permit access to the account notwithstanding a user status of "HOME." For example, the user may wish to process a notification of user activity for an account at a first online service provider (e.g., Amazon) but not a second online service provider (e.g., Bank of America) with a user status of "HOME."

FIG. 6B illustrates a user interface 428, according to an embodiment. The user interface 428 may be displayed on the mobile device 102 (e.g., mobile telephone). The user interface 400 may be communicated from an application server 112, 114, 116 to the mobile device 102. The user interface 428 may be communicated to the mobile device 102 to enable a user to configure processing on the application server 112, 114, 116 in response to loss of connectivity with the alarm server 106. For example, a loss of connectivity may occur if the application server and the alarm server 106 are unable to communicate for a predetermined period of time. The user interface 428 may include a domain identification panel 430 and a configuration panel 432. The configuration panel 432 may include user interface control elements in the form of radio buttons 434, 436 and 438. The radio button 434 may be selected to configure the application server to block access to the account responsive to loss of connectivity with the alarm server 106. The radio button 436 may be selected to configure the application server to permit access to the account responsive to loss of connectivity with the alarm server 106. The radio button 438 may be selected to configure the application server to provide restricted access (e.g., read-only access) to the account responsive to loss of connectivity with the alarm server 106. The application server 112, 114, or 116 may store the above information as application user information 132 in the service information 111.

FIG. 7 illustrates a user interface 450, according to an embodiment. The user interface 450 may be displayed on the mobile device 102 (e.g., mobile telephone). The user interface 450 may be communicated from the alarm server 106 to the mobile telephone to enable a user to configure status information 130 on the alarm server 106. The user interface 450 may include a present status panel 452 and a configuration panel 454. The present status panel 452 may indicate the present alarm status and enable the user to toggle the status. For example, present status panel 452 is presently displaying an alarm status of "DISARMED," and the configuration panel 454 enables the user to toggle the alarm status to "ARMED" by selecting the "ENTER" button.

Figure 8:
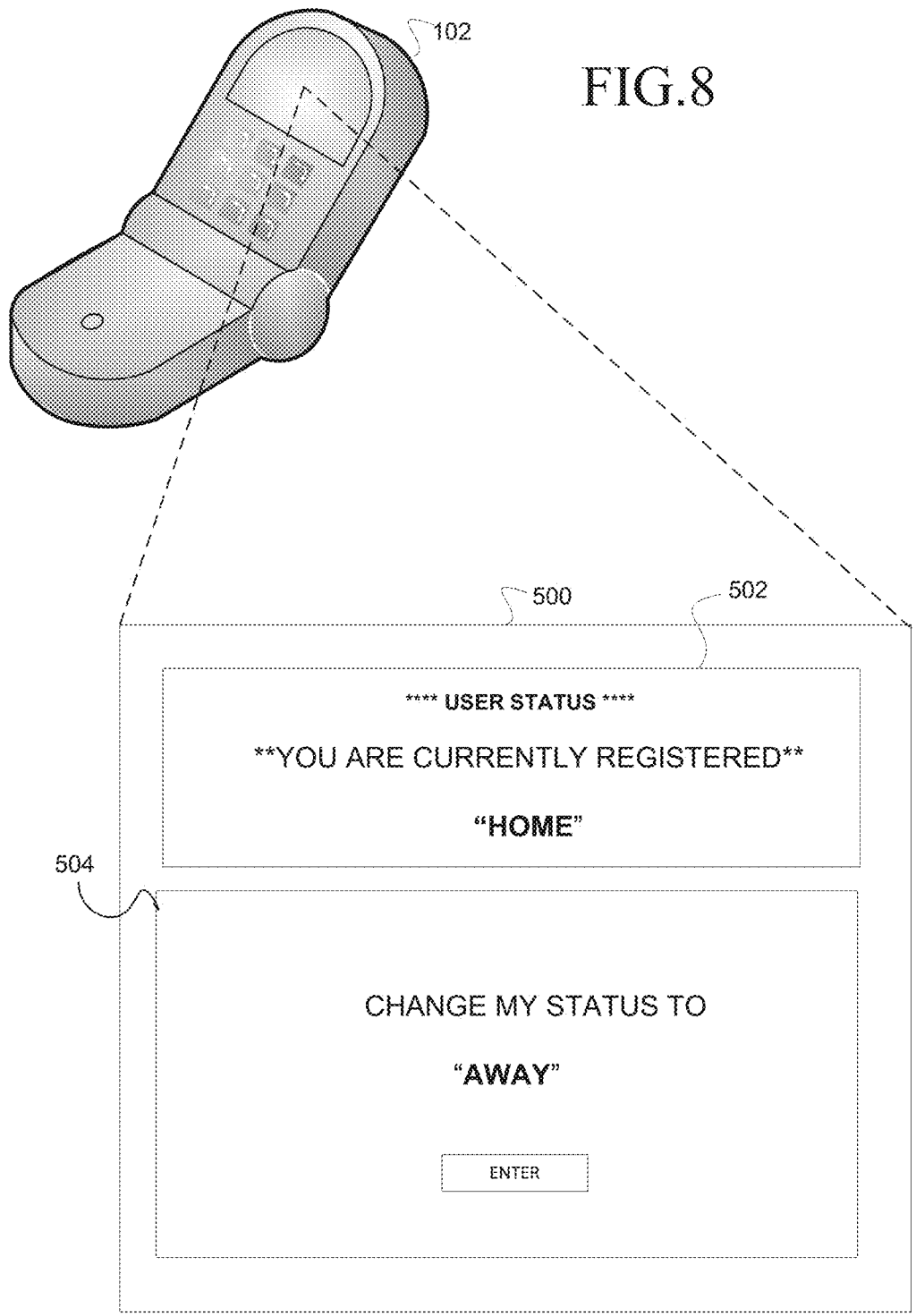

FIG. 8 illustrates a user interface 500, according to an embodiment. The user interface 500 may be displayed on a mobile device 102 (e.g., mobile telephone). The user interface 500 may be communicated from the alarm server 106 to the mobile telephone to enable a user to configure status information 130 on the alarm server 106. The user interface 500 may include a present status panel 502 and a configuration panel 504. The present status panel 502 may indicate status information 130 in the form of a present location status and enable the user to toggle the present location status. For example, present status panel 502 is presently displaying location status of "HOME" and the configuration panel 504 enables the user to toggle the location status to "AWAY" by selecting the enter button.

Figure 9:
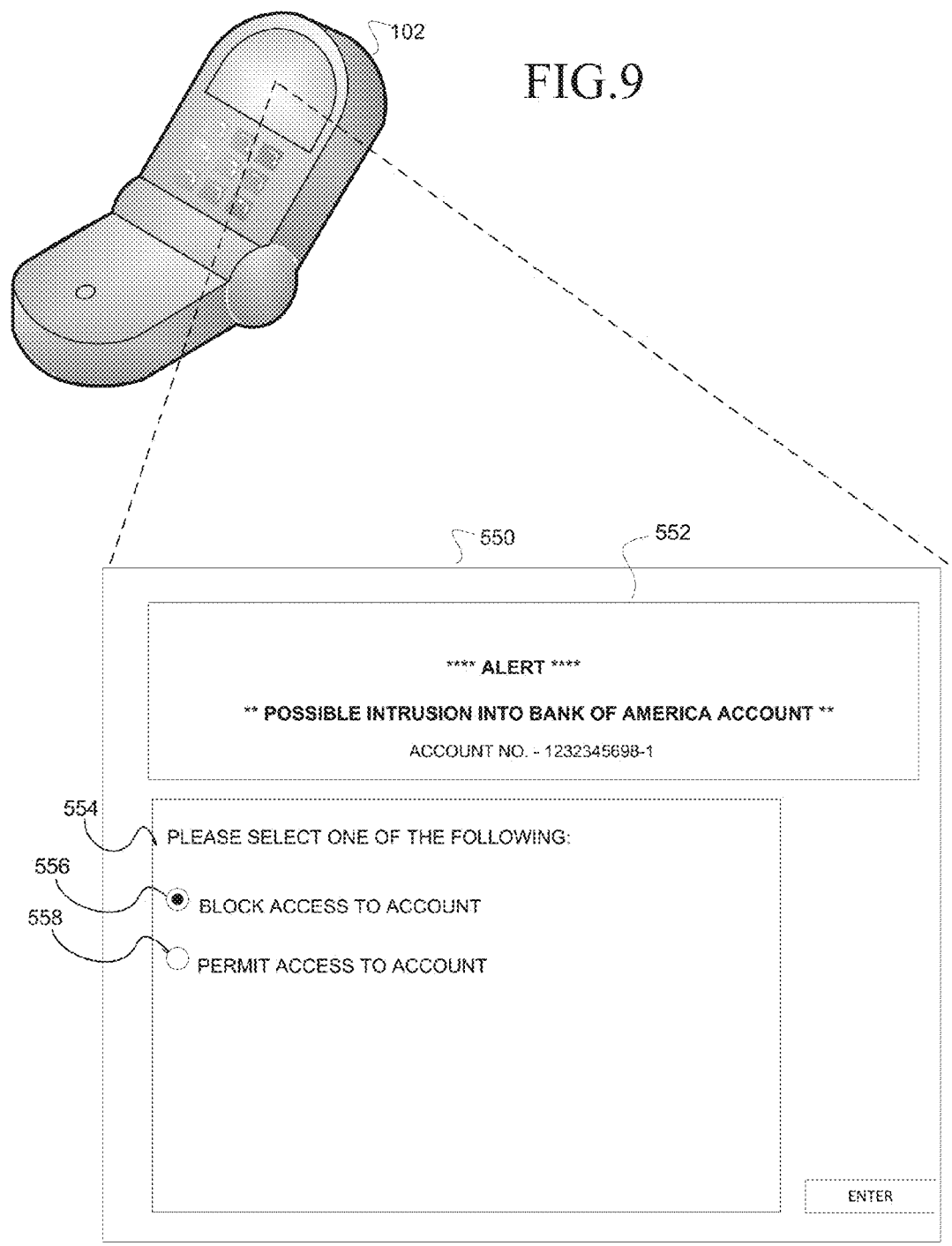

FIG. 9 illustrates a user interface 550, according to an embodiment. The user interface 550 may be displayed on a mobile device 102 (e.g., mobile telephone) responsive to receipt of a notification of user activity from an application server 112, 114, 116. The user interface 550 may be communicated from the alarm server 106 to the mobile device 102 (e.g., mobile telephone) to request instructions from the user. The user interface 550 may include an alert information panel 552 and an instruction panel 554. The alert information panel 552 may indicate an alert of a possible intrusion into an account of the user at an online service provider. The possible intrusion may be based on the user activity that was detected in the user account at the online service provider and reported in a notification to the alarm server 106. For example, the alert information panel 552 is illustrated as displaying the name of an online service provider and an account in which a possible intrusion was detected. The instruction panel 554 enables the user to provide instructions to respond to the notification. The instruction panel includes mutually exclusive radio buttons 556 and 558. The radio button 556 may be selected by the user to instruct the alarm server 106 to respond to the application server 112, 114, 116 with instructions to block access to the account. The radio button 558 may be selected by the user to instruct the alarm server 106 to respond to the application server 112, 114, 116 with instructions to permit access to the account.

Figure 10:
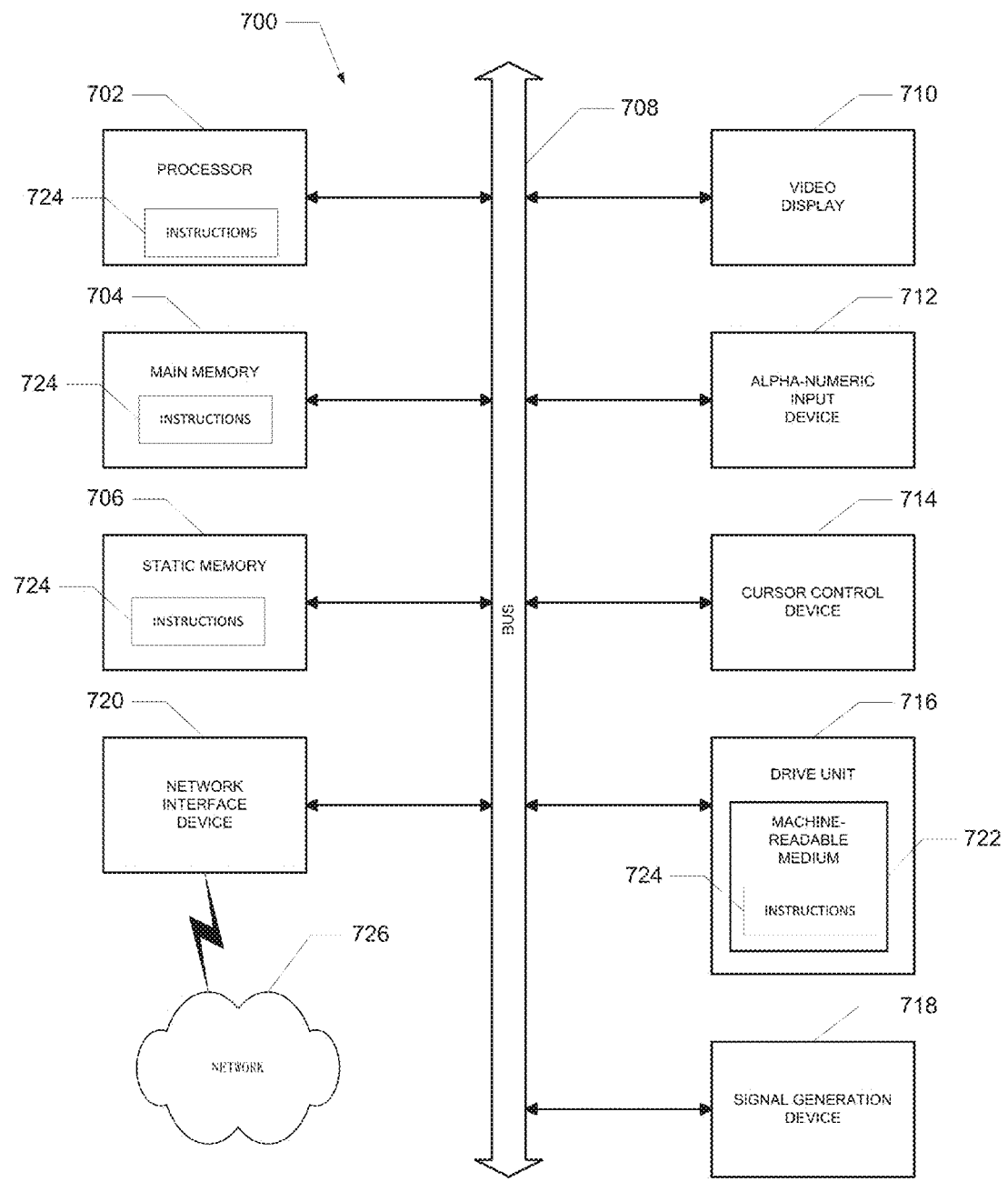
FIG. 10 shows a diagrammatic representation of a machine in the form of a computer system within which a set of instructions for causing the machine to perform any one or more of the methodologies discussed herein may be executed according to an example embodiment.

FIG. 10 shows a diagrammatic representation of a machine in the example form of a computer system 700 within which a set of instructions 724 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in client-server network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker), and a network interface device 720.

The disk drive unit 716 includes a machine-readable medium 722 on which is stored one or more sets of instructions 724 (e.g., software) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations. In example embodiments, a computer system (e.g., a standalone, client, or server computer system) configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g., configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. While the machine-readable medium. 722 is shown in an example embodiment to be a single medium, the term "machine-readable medium" should be taken to include a single medium or multiple media (e.g., a centralized or distributed database, and/or associated caches and servers) that store the one or more sets of instructions 724. The term "machine-readable medium" shall also be taken to include any medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical and magnetic media, and carrier wave signals. As noted, the software may be transmitted over a network using a transmission medium. The term "transmission medium" shall be taken to include any medium that is capable of storing, encoding, or carrying instructions for transmission to, and execution by, the machine, and includes digital or analog communications signals or other intangible mediums to facilitate transmission and communication of such software.

The illustrations of embodiments described herein are intended to provide a general understanding of the structure of various embodiments, and they are not intended to serve as a complete description of all the elements and features of apparatuses and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

Thus, methods and systems for detecting an electronic intrusion are disclosed. While the present disclosure has been described in terms of several example embodiments, those of ordinary skill in the art will recognize that the present disclosure is not limited to the embodiments described, but may be practiced with modification and alteration within the scope of the appended claims. The description herein is thus to be regarded as illustrative instead of limiting.

What is claimed is:

1. A method comprising:
receiving, from a server, an indication of a user activity for a user account for a service provided by the server;
determining a location of a user corresponding to the user account;
identifying, in part based on the location of the user, whether to communicate a request to the user for instructions to respond to the user activity;
in response to determining to communicate the request to the user for instructions, receiving a response from the user, the response including instructions to block access to the user account at the server; and
communicating command information to the server based on the response, the command information including a command to block access to the user account, the command to block access to the user account preventing access to the user account until a command to unblock access to the account is received.

2. The method of claim 1, wherein the command to block access to the user account allows read-only access to the user account.

3. The method of claim 1, further comprising:
receiving a status update from the user;
identifying, from the status update, instructions to unblock access to the user account at the server; and
communicating updated command information to the server based on the status update, the updated command information including a command to unblock access to the user account.

4. The method of claim 1, further comprising registering a mobile device of the user for communication of the request.

5. The method of claim 4, wherein the determining the location of the user includes receiving an indication of the location from the mobile device.

6. The method of claim 1, further comprising:
identifying a second user activity at a second server;

receiving a second response from the user including instructions to permit access to a second user account at the second server; and communicating second server command information to the second server based on the second response, the second server command information including a command to permit access to the second user account.

7. A system comprising:

at least one processor;

a memory; and a set of instructions operable on the at least one processor to:

receive, from a server, identification of a user activity for a user account for a service provided by the server;

determine a location of a user corresponding to the user account;

identify whether to communicate a request to the user for instructions to respond to the user activity, based at least in part on the location of the user;

responsive to determination to communicate the request to the user for instructions, receive a response from the user, the response including instructions to block access to the user account at the server; and communicate command information to the server based on the response, the command information including a command to block access to the user account, wherein the command to block access to the user account prevents access to the user account until a command to unblock access to the account is received.

8. The system of claim 7, wherein the command to block access to the user account allows read-only access to the user account.

9. The system of claim 7, the set of instructions operable on the at least one processor further to:

receive a status update from the user;

identify, from the status update, instructions to unblock access to the user account at the server; and communicate updated command information to the server based on the status update, the updated command information including a command to unblock access to the user account.

10. The system of claim 7, the set of instructions operable on the at least one processor further to register a mobile device of the user for communication of the request.

11. The system of claim 10, wherein the set of instructions to determine the location of the user include instructions to receive an indication of the location from the mobile device.

12. The system of claim 7, the set of instructions operable on the one or more processors further to:

identify a second user activity at a second server;

receive a second response from the user including instructions to permit access to a second user account at the second server; and communicate second server command information to the second server based on the second response, the second server command information including a command to permit access to the second user account.

13. The system of claim 12, wherein the set of instructions to identify the second user activity include instructions to transmit a request to the user to authorize the application programming interface calls by the server.

14. A non-transitory machine readable medium that stores instructions which when operated by a machine, cause the machine to perform operations comprising:

receiving, from a server, identification of a user activity for a user account for a service provided by the server;

determining a location of a user corresponding to the user account;

identifying whether to communicate a request to the user for instructions to respond to the user activity, based at least in part on the location of the user;

responsive to determination to communicate the request to the user for instructions, receiving a response from the user, the response including instructions to block access to the user account at the server; and communicating command information to the server based on the response, the command information including a command to block access to the user account, the command to block access to the user account preventing access to the user account until a command to unblock access to the account is received.

15. The machine readable medium of claim 14, wherein the command to block access to the user account allows read-only access to the user account.

16. The machine readable medium of claim 14, further comprising:

receiving a status update from the user;

identifying, from the status update, instructions to unblock access to the user account at the server; and communicating updated command information to the server based on the status update, the updated command information including a command to unblock access to the user account.

17. The machine readable medium of claim 14, further comprising registering a mobile device of the user for communication of the request.

18. The machine readable medium of claim 17, wherein the determining the location of the user includes receiving an indication of the location from the mobile device.

19. The machine readable medium of claim 14, further comprising:

identifying a second user activity at a second server;

receiving a second response from the user including instructions to permit access to a second user account at the second server; and communicating second server command information to the second server based on the second response, the second server command information including a command to permit access to the second user account.

20. The machine readable medium of claim 19, wherein the identifying the second user activity further comprises transmitting a request to the user to authorize the application programming interface calls by the server.

* * * * *